United States Patent
Barlow et al.

(10) Patent No.: US 8,902,533 B1
(45) Date of Patent: Dec. 2, 2014

(54) DISK DRIVE DETECTING DIFFERENT ASPERITIES ON A DISK USING DIFFERENT SENSOR BIAS SETTINGS

(71) Applicant: Western Digital Technologies, Inc., Irvine, CA (US)

(72) Inventors: Carl E. Barlow, Lake Forest, CA (US); Chun Sei Tsai, Tustin, CA (US); Chirag C. Patel, Rancho Santa Margarita, CA (US); Boon Sien Chew, Klang (MY); Thomas A. O'Dell, Sunnyvale, CA (US); David E. Wachenschwanz, Saratoga, CA (US); David E. Fowler, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/015,748

(22) Filed: Aug. 30, 2013

(51) Int. Cl.
   *G11B 5/02* (2006.01)
   *G11B 21/02* (2006.01)

(52) U.S. Cl.
   USPC .............................................. 360/55; 360/75

(58) Field of Classification Search
   USPC .................... 360/29, 31, 75, 46, 55, 77.02
   See application file for complete search history.

(56) References Cited

U.S. PATENT DOCUMENTS

| | | |
|---|---|---|
| 5,450,747 A | 9/1995 | Flechsig et al. |
| 5,666,237 A | 9/1997 | Lewis |
| 5,790,334 A | 8/1998 | Cunningham |
| 5,808,184 A | 9/1998 | Boutaghou et al. |
| 5,825,181 A | 10/1998 | Schaenzer et al. |
| 5,901,001 A | 5/1999 | Meyer et al. |
| 6,004,030 A | 12/1999 | Abraham et al. |
| 6,019,503 A | 2/2000 | Abraham et al. |
| 6,130,793 A | 10/2000 | Ohmori et al. |
| 6,175,457 B1 | 1/2001 | Flynn |
| 6,262,858 B1 | 7/2001 | Sugiyama et al. |
| 6,275,029 B1 * | 8/2001 | Schaff ............................ 324/212 |
| 6,310,739 B1 | 10/2001 | McEwen et al. |
| 6,311,551 B1 | 11/2001 | Boutaghou |
| 6,494,085 B2 | 12/2002 | Wakefield et al. |
| 6,504,662 B2 | 1/2003 | Sobey |
| 6,556,366 B2 | 4/2003 | Patti et al. |
| 6,608,728 B1 | 8/2003 | Sugiyama |
| 6,724,550 B2 | 4/2004 | Lim et al. |
| 6,751,039 B1 | 6/2004 | Cheng et al. |
| 6,920,001 B2 | 7/2005 | Chua et al. |
| 6,940,669 B2 | 9/2005 | Schaenzer et al. |
| 7,027,263 B2 | 4/2006 | Ottesen et al. |
| 7,097,110 B2 | 8/2006 | Sheperek et al. |
| 7,265,922 B2 * | 9/2007 | Biskeborn et al. ............... 360/55 |
| 7,271,967 B2 | 9/2007 | Shi et al. |
| 7,595,948 B1 | 9/2009 | Oberg |
| 7,760,458 B1 | 7/2010 | Trinh |
| 7,804,657 B1 | 9/2010 | Hogg et al. |
| 7,872,824 B1 | 1/2011 | Macchioni et al. |

(Continued)

*Primary Examiner* — Nabil Hindi (57) ABSTRACT

A disk drive is disclosed comprising a disk comprising a plurality of data tracks, and a head actuated over the disk, the head comprising an asperity sensor operable to generate a sensor signal having a magnitude based on a bias setting of the asperity sensor. The asperity sensor is configured with a first bias setting and a first asperity on the disk is detected based on the sensor signal generated at the first bias setting. The asperity sensor is configured with a second bias setting different from the first bias setting and a second asperity on the disk is detected based on the sensor signal generated at the second bias setting.

24 Claims, 6 Drawing Sheets

(56) References Cited

U.S. PATENT DOCUMENTS

| | | |
|---|---|---|
| 8,031,420 B2 | 10/2011 | Mathew et al. |
| 8,045,283 B2 | 10/2011 | Yang et al. |
| 8,259,406 B2 | 9/2012 | Kazusawa et al. |
| 8,427,770 B1 | 4/2013 | O'Dell et al. |
| 8,477,455 B2 | 7/2013 | Furukawa et al. |
| 2003/0210486 A1 | 11/2003 | Ottesen et al. |
| 2011/0157736 A1 | 6/2011 | Contreras et al. |
| 2012/0120982 A1 | 5/2012 | Anaya-Dufresne et al. |
| 2012/0158349 A1 | 6/2012 | Lee et al. |
| 2013/0083430 A1 | 4/2013 | Chiu et al. |
| 2013/0163110 A1 | 6/2013 | Garzon et al. |
| 2014/0023108 A1* | 1/2014 | Johnson et al. .......... 374/45 |

* cited by examiner

DISK DRIVE DETECTING DIFFERENT ASPERITIES ON A DISK USING DIFFERENT SENSOR BIAS SETTINGS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
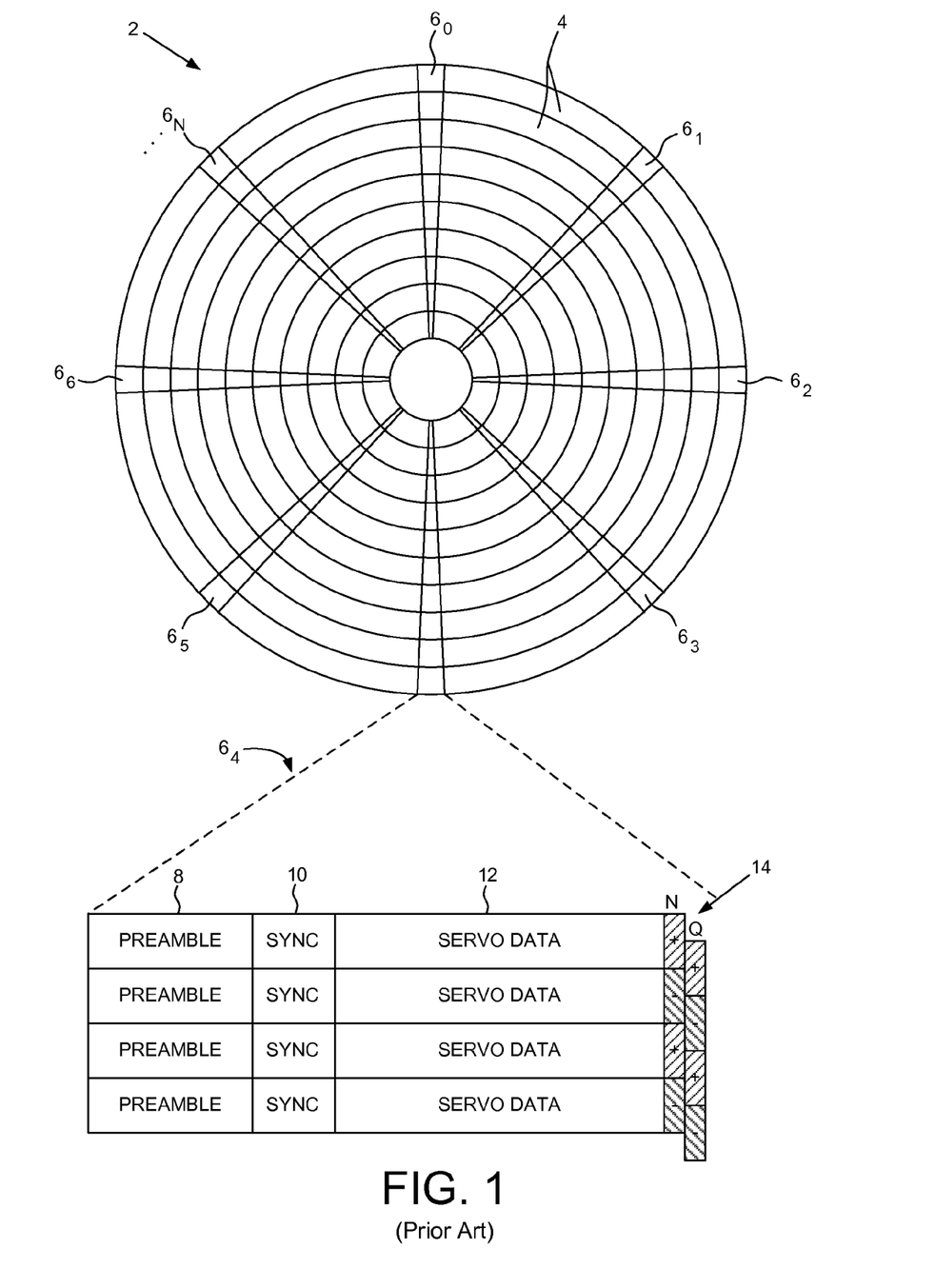
FIG. 1 shows a prior art format of a disk comprising a number of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6, further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figures 2A, 2B, 2C:
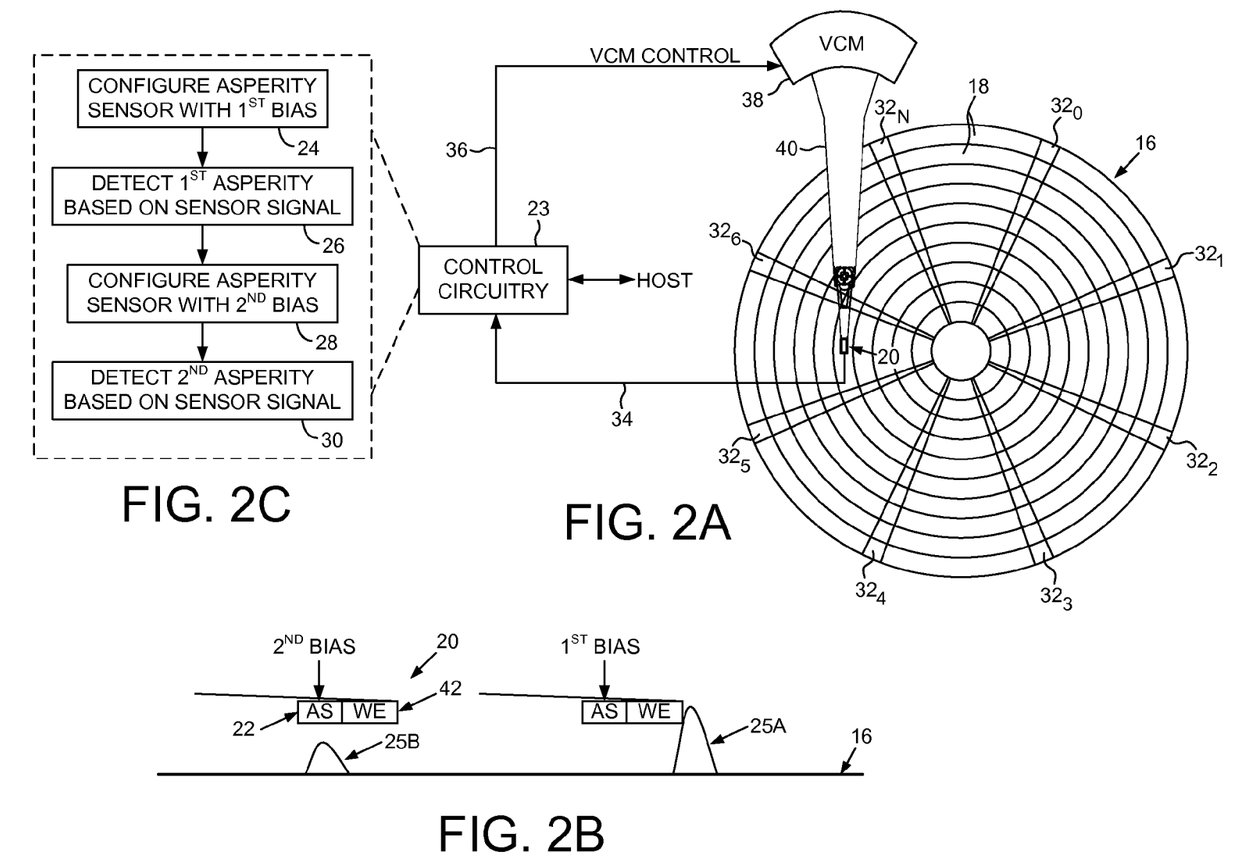
FIG. 2A shows a disk drive according to an embodiment comprising a head actuated over a disk.
FIG. 2B shows an embodiment wherein the head comprises a write element and an asperity sensor which may be a read element, or separate from the read element.
FIG. 2C is a flow diagram according to an embodiment wherein the asperity sensor is configured with a first bias setting to detect a first asperity on the disk, and configured with a second bias setting to detect a second asperity on the disk.

FIG. 2A shows a disk drive according to an embodiment comprising a disk 16 comprising a plurality of data tracks 18, and a head 20 actuated over the disk 16, the head 20 comprising an asperity sensor 22 (FIG. 2B) operable to generate a sensor signal having a magnitude based on a bias setting of the asperity sensor 22. The disk drive further comprises control circuitry 23 operable to execute the flow diagram of FIG. 2C with an example illustrated in FIG. 2B, wherein the asperity sensor is configured with a first bias setting (block 24) and a first asperity 25A on the disk is detected based on the sensor signal generated at the first bias setting (block 26). The asperity sensor is configured with a second bias setting different from the first bias setting (block 28) and a second asperity 25B on the disk is detected based on the sensor signal generated at the second bias setting (block 30).

In the embodiment of FIG. 2A, the disk 16 comprises a plurality of servo tracks defined by servo sectors $32_0$-$32_N$, wherein the data tracks 18 are defined relative to the servo tracks at the same or different radial density. The control circuitry 23 processes a read signal 34 emanating from the head 20 to demodulate the servo sectors $32_0$-$32_N$ and generate a position error signal (PES) representing an error between the actual position of the head and a target position relative to a target track. The control circuitry 23 filters the PES using a suitable compensation filter to generate a control signal 36 applied to a voice coil motor (VCM) 38 which rotates an actuator arm 40 about a pivot in order to actuate the head 20 radially over the disk 16 in a direction that reduces the PES. The servo sectors $32_0$-$32_N$ may comprise any suitable head position information, such as a track address for coarse positioning and servo bursts for fine positioning. The servo bursts may comprise any suitable pattern, such as an amplitude based servo pattern or a phase based servo pattern.

Any suitable asperity sensor 22 may be employed in the embodiments, such as a magnetoresistive (MR) element or a semiconductor metal (e.g., Ni80Fe20) having a resistance that varies with temperature (thermistor). In embodiments employing a thermistor, the asperity sensor 22 may comprise a positive or negative temperature coefficient meaning the resistance may increase or decrease with a rising temperature. In this embodiment, an asperity may be detected, for example, by applying a constant bias voltage to the asperity sensor 22 and measuring the change in current, or by applying a constant bias current and measuring the change in voltage. In one embodiment, the asperity sensor 22 may be implemented using the read element of the head 20, and another embodiment, the asperity sensor 22 may be implemented as a element separate from the read element and the write element 42.

In one embodiment, different size asperities on the disk 16 may have a different thermal affect on the asperity sensor 22. An example is shown in FIG. 2B wherein the asperity 25B reduces the flying distance between the asperity sensor 22 and the disk 16 which may have a cooling affect on the asperity sensor 22, whereas the asperity 25A may cause a heating affect due to the asperity sensor 22 contacting the asperity 25B. In one embodiment illustrated in FIG. 3A, the cooling effect of the asperity 25B may increase the resistance of the asperity sensor 22 which may result in a negative pulse sensor signal (e.g., negative current measurement when applying a bias voltage), whereas the heating effect of the asperity 25A may decrease the resistance of the asperity sensor causing a positive pulse sensor signal. An asperity may then be detected when the sensor signal exceeds either a negative or positive threshold as shown in FIG. 3A.

Figure 3A:
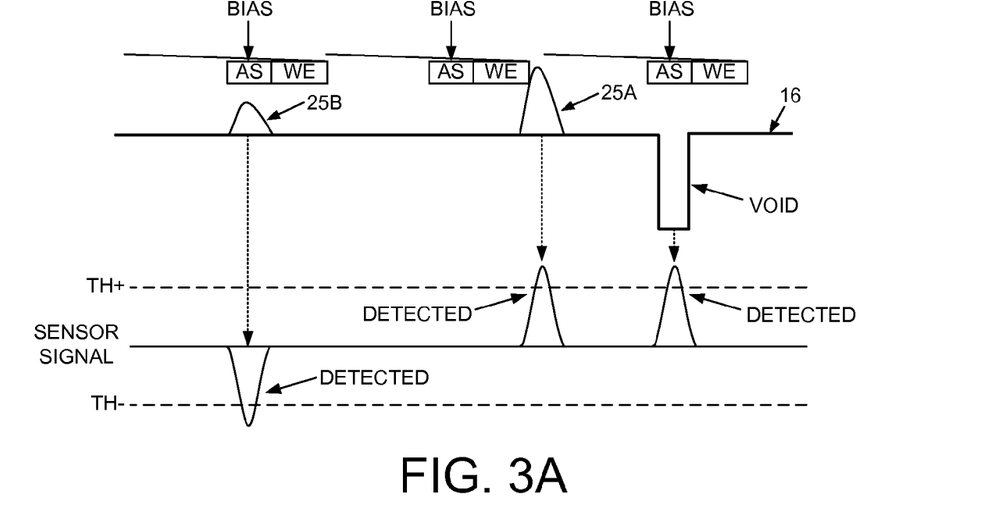
FIG. 3A shows an example wherein when using a single bias setting to detect asperities, a void may be falsely detected as an asperity.
Figure 3B:
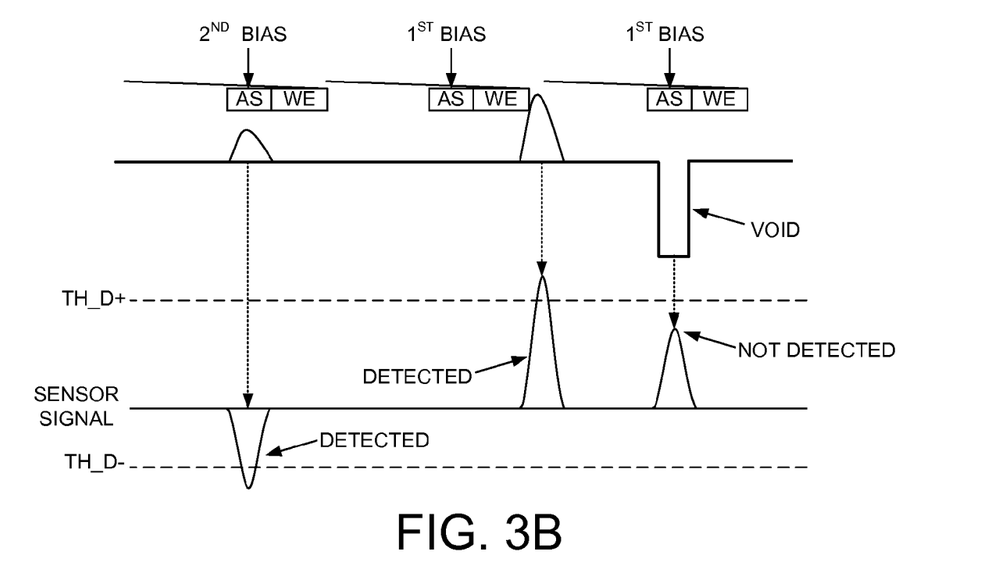
FIG. 3B shows an example wherein when using first and second bias settings a void is not detected as an asperity.

FIG. 3A also illustrates that when a single bias setting is applied to the asperity sensor 22, a void on the disk 16 may be falsely detected as an asperity due to the heating affect that a void may have on the asperity sensor 22. That is, for a particular bias setting, a void on the disk may induce the same response as a certain size asperity. In one embodiment, in order to distinguish between a void and an asperity, one of two bias settings are applied to the asperity sensor 22 when scanning the disk for asperities. This is illustrated in FIG. 3B wherein a first bias setting may be applied to the asperity sensor 22 for detecting larger asperities that induce a positive pulse sensor signal, and a second bias setting may be applied to the asperity sensor 22 for detecting smaller asperities that induce a negative pulse sensor signal. When evaluating the larger asperities, the heating affect of a void is reduced due to the different bias setting, and therefore the void is not detected relative to the positive threshold. A second bias setting may then be applied to the asperity sensor 22 for detecting smaller asperities that induce a negative pulse sensor signal as shown in FIG. 3B.

Figure 3C:
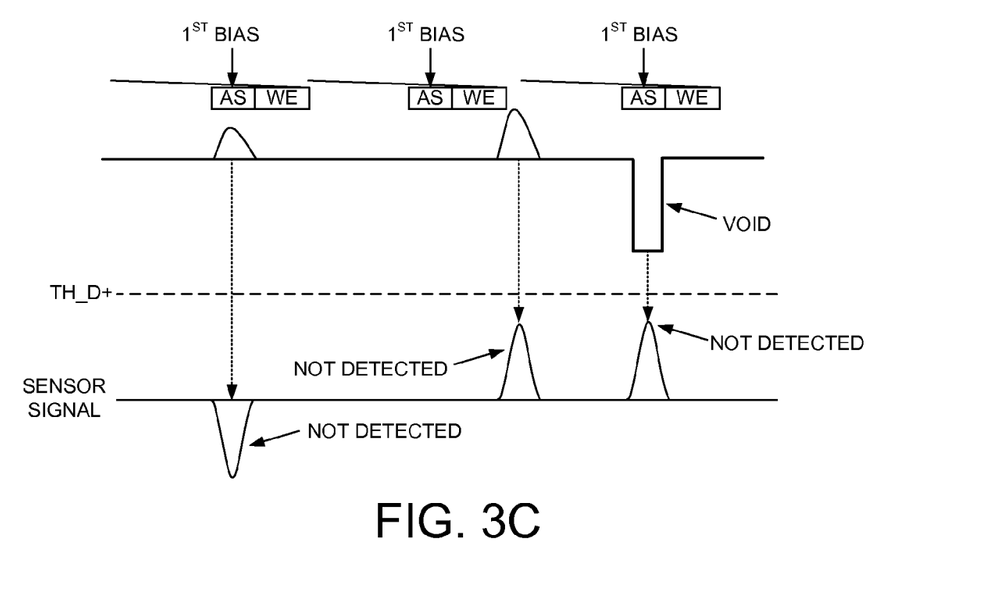
FIGS. 3C and 3D show an example wherein when an asperity that is not detected using the first bias setting (together with a void not being detected), the asperity may be detected using the second bias setting.
Figure 3D:
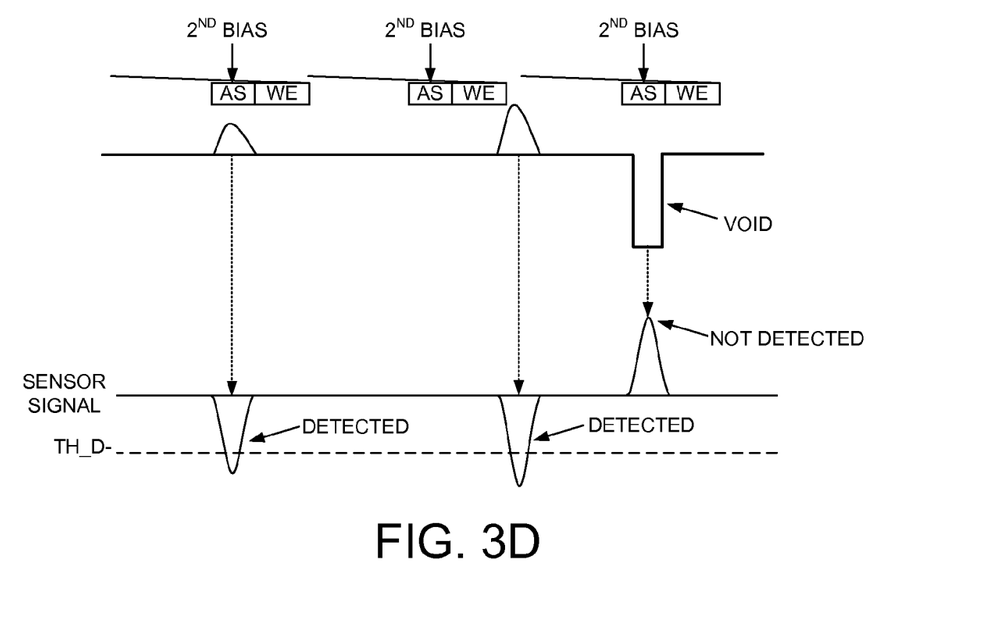

FIG. 3C further illustrates the embodiment wherein when scanning the disk using the first bias setting relative to the positive threshold, a void may induce a positive pulse sensor signal that does not exceed the positive threshold and therefore is not detected as an asperity. FIG. 3C also illustrates how a medium size asperity may induce a positive pulse sensor signal at the first bias setting that may not exceed the positive threshold and therefore also not detected. However, as illustrated in FIG. 3D, when scanning the disk using the second bias setting relative to the negative threshold, the medium size asperity may generate a negative pulse sensor signal that exceeds the negative threshold, and is therefore detected as an asperity. At the second bias setting, a void will typically induce a positive pulse or a small negative pulse that does not exceed the negative threshold as shown in FIG. 3D, and therefore is not detected as an asperity.

In one embodiment, the first bias setting (e.g., bias voltage) is lower than the second bias setting. The bias voltage may be calibrated so as to achieve a desired accuracy in asperity detection while mapping out (ignoring) the voids. In one embodiment illustrated in FIG. 3B, the absolute magnitude of the positive threshold may be greater than the absolute magnitude of the negative threshold. Similar to the bias setting, the positive and negative thresholds may be calibrated to achieve a desired accuracy in asperity detection while mapping out (ignoring) the voids. In one embodiment, the bias setting and/or thresholds may be calibrated by evaluating a subset of disk drives in a family of disk drives to generate nominal settings stored in each production disk drive. In another embodiment, the bias setting and/or thresholds may be calibrated by the control circuitry 23 within each production disk drive. In one embodiment, one or more voids may be induced at a particular area on the disk in order to facilitate the calibration process.

Figure 4A:
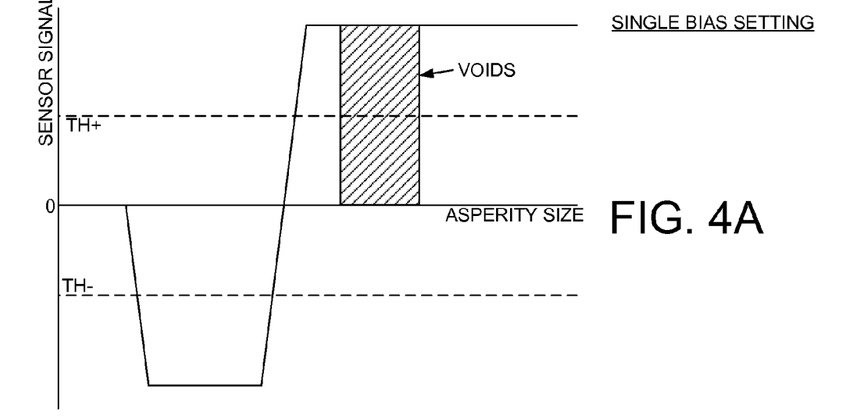
FIG. 4A shows an example of the sensor signal generated by the asperity sensor relative to the asperity size, and the detection of the asperities using a single bias setting, wherein voids may be falsely detected over a range of asperity size.
Figure 4B:
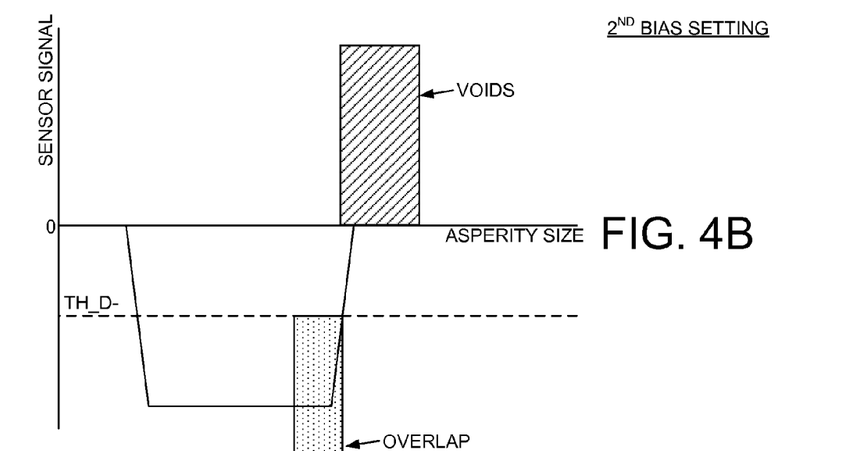
FIGS. 4B and 4C illustrate how when using first and second bias settings, the voids are mapped out of the detection area while still detecting substantially all of the true asperities.
Figure 4C:
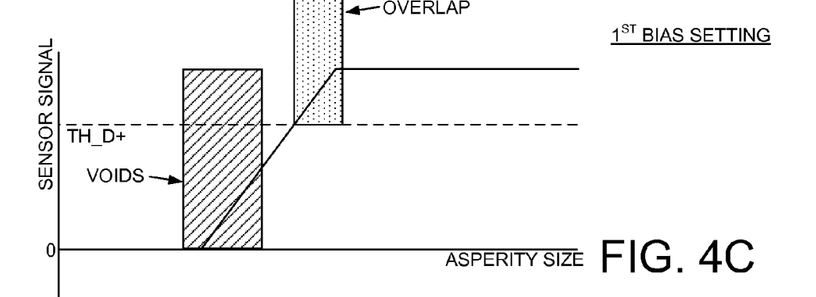

FIG. 4A further illustrates an example of the sensor signal response relative to the asperity size when using a single bias setting applied to the asperity sensor 22. As shown in the figure, there may be range of void sizes that overlap with a range of asperity sizes that, when using a single bias setting, will falsely be detected as an asperity. FIG. 4C illustrates that if the bias setting is changed, in one embodiment the range of voids will shift and overlap a range of smaller asperities which will not be detected relative to the positive threshold (TH_D+). In effect, the voids are mapped out of the detection region when applying the first bias setting to the asperity sensor 22. When evaluating the disk for smaller asperities, the second bias setting is applied to the asperity sensor 22 and the sensor signal evaluated relative to the negative threshold (TH_D−) as illustrated in FIG. 4B. Since the voids shown in the example of FIG. 4B cause a positive pulse sensor signal, the voids are again mapped out of the detection region when applying the second bias setting to the asperity sensor 22. FIGS. 4B and 4C also illustrate that in one embodiment, there is an overlap for a range of asperities sizes wherein these asperities may be detected either using the first or second bias setting. In one embodiment, this overlap helps ensure that all of the asperities are detected (no blind spots) while still mapping out the voids. In one embodiment, if an asperity is detected using the first bias setting, the same area of the disk is not evaluated using the second bias setting. Alternatively, the same area of the disk may be evaluated using the second bias setting in order to confirm the asperity.

Figure 5A:
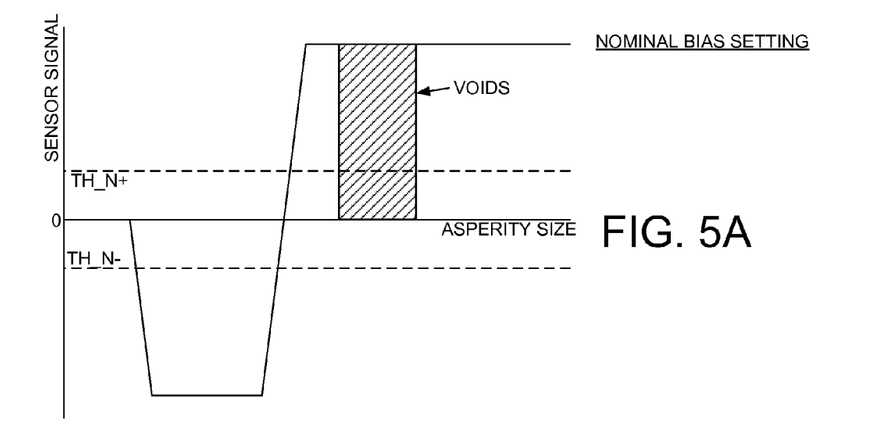
FIG. 5A shows an embodiment wherein during a first scan of the disk, a single bias setting is applied to the asperity sensor and a detection threshold reduced so as to identify suspect areas of the disk which may include voids.

In one embodiment, the control circuitry 23 first scans the disk 16 using a single, nominal bias setting and a lower positive and negative threshold as illustrated in FIG. 5A. All of the areas on the disk that are suspected to be either an asperity or a void are stored in a log. The control circuitry then performs a second two-phase scan of the disk at the suspect locations. During the first phase scan, the control circuitry 23 applies the first bias setting to the asperity sensor 22 and evaluates the sensor signal relative to the positive threshold as shown in FIG. 4C, and during the second phase, the control circuitry 23 applies the second bias setting to the asperity sensor 22 and evaluates the sensor signal relative to the negative threshold as shown in FIG. 4B. That is, in one embodiment the sensor signal generated at the first bias setting may comprise a first polarity (e.g., positive), and the sensor signal generated at the second bias setting may comprise a second polarity (e.g., negative) opposite the first polarity.

Figure 5B:
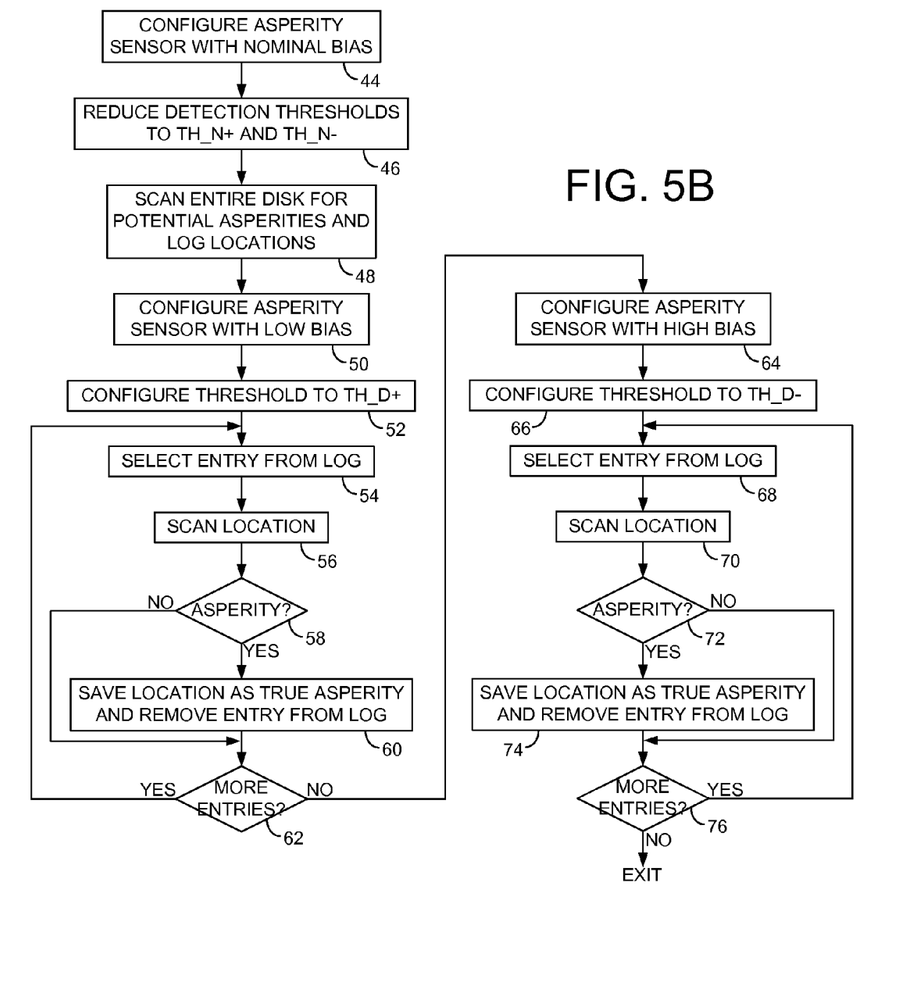
FIG. 5B is a flow diagram according to an embodiment wherein after performing the first scan of the disk to identify the suspect locations, the suspect locations are evaluated using the first and second bias settings in order to detect the asperities and map out the voids.

An example of this embodiment is illustrated in the flow diagram of FIG. 5B. The asperity sensor is first configured with a nominal bias setting (block 44) and the detection thresholds reduced (block 46) as illustrated in FIG. 5A. The entire disk is then scanned for potential asperities (or voids) and the corresponding locations on the disk are logged (block 48). The asperity sensor is then configured (block 50) with the first bias setting (e.g., low bias setting) and the positive threshold is increased (block 52). An entry from the log is selected (block 54) and the location scanned using the asperity sensor (block 56). If an asperity is detected at the location (block 58), the location is saved as a true asperity and the entry is removed from the log (block 60). This process is repeated (block 62) until all of the entries in the log have been evaluated. The asperity sensor is then configured (block 64) with the second bias setting (e.g., high bias setting) and the negative threshold is increased (block 66). An entry from the log is selected (block 68) and the location scanned using the asperity sensor (block 70). If an asperity is detected at the location (block 72) the location is saved as a true asperity and the entry is removed from the log (block 74). This process is repeated (block 76) until all of the entries in the log have been evaluated.

When the second phase of the scan is completed, the locations of the true asperities will have been saved, and the locations of the voids may be discarded. In another embodiment, the locations remaining in the log not detected as asperities are assumed to be voids, and in one embodiment this information may be evaluated to provide additional diagnostic information about the quality of each disk surface. The saved locations of the true asperities may be used in any suitable manner, such as to evaluate the quality of each disk surface, and/or to adjust the fly height during seeks, and/or to map out the locations as unusable, etc.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
   a disk comprising a plurality of data tracks;
   a head actuated over the disk, the head comprising an asperity sensor operable to generate a sensor signal having a magnitude based on a bias setting of the asperity sensor; and
   control circuitry operable to:
      configure the asperity sensor with a first bias setting and detect a first asperity on the disk based on the sensor signal generated at the first bias setting; and
      configure the asperity sensor with a second bias setting different from the first bias setting and detect a second asperity on the disk based on the sensor signal generated at the second bias setting,
      wherein the first bias setting comprises a first DC component and the second bias setting comprises a second DC component different from the first DC component.

2. The disk drive as recited in claim 1, wherein:
   the sensor signal generated at the first bias setting comprises a first polarity; and
   the sensor signal generated at the second bias setting comprises a second polarity opposite the first polarity.

3. The disk drive as recited in claim 2, wherein:
   the first asperity causes a heating response of the asperity sensor; and
   the second asperity causes a cooling response of the asperity sensor.

4. The disk drive as recited in claim 3, wherein:
   the first asperity contacts the head which causes the heating response; and
   the second asperity reduces a distance between the head and the disk.

5. The disk drive as recited in claim 4, wherein the first and second bias settings are selected so that a void on the disk is not detected as an asperity.

6. The disk drive as recited in claim 4, wherein the first bias setting is lower than the second bias setting.

7. The disk drive as recited in claim 4, wherein the control circuitry is further operable to:
   compare the sensor signal to a first threshold to detect the first asperity; and
   compare the sensor signal to a second threshold to detect the second asperity.

8. The disk drive as recited in claim 7, wherein an absolute magnitude of the first threshold is greater than an absolute magnitude of the second threshold.

9. The disk drive as recited in claim 5, wherein the control circuitry is further operable to:
   first scan substantially the entire disk by configuring the asperity sensor with a third bias setting and detect the first asperity and the second asperity based on the sensor signal generated at the third bias setting;
   save a location on the disk for the first asperity and the second asperity in an asperity log; and
   second scan the disk at the locations saved in the asperity log when detecting the first asperity based on the sensor signal generated at the first bias setting and when detecting the second asperity based on the sensor signal generated at the second bias setting.

10. The disk drive as recited in claim 9, wherein the third bias setting is different from the first bias setting and the second bias setting.

11. A method of operating a disk drive comprising:
configuring an asperity sensor of a head with a first bias setting and detecting a first asperity on a disk based on a sensor signal generated by the asperity sensor at the first bias setting; and
configuring the asperity sensor with a second bias setting different from the first bias setting and detect a second asperity on the disk based on the sensor signal generated at the second bias setting,
wherein the first bias setting comprises a first DC component and the second bias setting comprises a second DC component different from the first DC component.

12. The method as recited in claim 11, wherein:
the sensor signal generated at the first bias setting comprises a first polarity; and
the sensor signal generated at the second bias setting comprises a second polarity opposite the first polarity.

13. The method as recited in claim 12, wherein:
the first asperity causes a heating response of the asperity sensor; and
the second asperity causes a cooling response of the asperity sensor.

14. The method as recited in claim 13, wherein:
the first asperity contacts the head which causes the heating response; and
the second asperity reduces a distance between the head and the disk.

15. The method as recited in claim 14, wherein the first and second bias settings are selected so that a void on the disk is not detected as an asperity.

16. The method as recited in claim 14, wherein the first bias setting is lower than the second bias setting.

17. The method as recited in claim 14, further comprising:
comparing the sensor signal to a first threshold to detect the first asperity; and
comparing the sensor signal to a second threshold to detect the second asperity.

18. The method as recited in claim 17, wherein an absolute magnitude of the first threshold is greater than an absolute magnitude of the second threshold.

19. The method as recited in claim 15, further comprising:
first scanning substantially the entire disk by configuring the asperity sensor with a third bias setting and detecting the first asperity and the second asperity based on the sensor signal generated at the third bias setting;
saving a location on the disk for the first asperity and the second asperity in an asperity log; and
second scanning the disk at the locations saved in the asperity log when detecting the first asperity based on the sensor signal generated at the first bias setting and when detecting the second asperity based on the sensor signal generated at the second bias setting.

20. The method as recited in claim 19, wherein the third bias setting is different from the first bias setting and the second bias setting.

21. A disk drive comprising:
a disk comprising a plurality of data tracks;
a head actuated over the disk, the head comprising an asperity sensor operable to generate a sensor signal having a magnitude based on a bias setting of the asperity sensor; and
control circuitry operable to:
configure the asperity sensor with a first bias setting and detect a first asperity on the disk based on the sensor signal generated at the first bias setting;
configure the asperity sensor with a second bias setting different from the first bias setting and detect a second asperity on the disk based on the sensor signal generated at the second bias setting;
compare the sensor signal to a first threshold to detect the first asperity; and
compare the sensor signal to a second threshold to detect the second asperity,
wherein an absolute magnitude of the first threshold is greater than an absolute magnitude of the second threshold.

22. A method of operating a disk drive comprising:
configuring an asperity sensor of a head with a first bias setting and detecting a first asperity on a disk based on a sensor signal generated by the asperity sensor at the first bias setting;
configuring the asperity sensor with a second bias setting different from the first bias setting and detect a second asperity on the disk based on the sensor signal generated at the second bias setting;
comparing the sensor signal to a first threshold to detect the first asperity; and
comparing the sensor signal to a second threshold to detect the second asperity,
wherein an absolute magnitude of the first threshold is greater than an absolute magnitude of the second threshold.

23. A disk drive comprising:
a disk comprising a plurality of data tracks;
a head actuated over the disk, the head comprising an asperity sensor operable to generate a sensor signal having a magnitude based on a bias setting of the asperity sensor; and
control circuitry operable to:
configure the asperity sensor with a first bias setting and detect a first asperity on the disk based on the sensor signal generated at the first bias setting;
configure the asperity sensor with a second bias setting different from the first bias setting and detect a second asperity on the disk based on the sensor signal generated at the second bias setting;
first scan substantially the entire disk by configuring the asperity sensor with a third bias setting and detect the first asperity and the second asperity based on the sensor signal generated at the third bias setting;
save a location on the disk for the first asperity and the second asperity in an asperity log; and
second scan the disk at the locations saved in the asperity log when detecting the first asperity based on the sensor signal generated at the first bias setting and when detecting the second asperity based on the sensor signal generated at the second bias setting.

24. A method of operating a disk drive comprising:
configuring an asperity sensor of a head with a first bias setting and detecting a first asperity on a disk based on a sensor signal generated by the asperity sensor at the first bias setting;
configuring the asperity sensor with a second bias setting different from the first bias setting and detect a second asperity on the disk based on the sensor signal generated at the second bias setting;
first scanning substantially the entire disk by configuring the asperity sensor with a third bias setting and detecting the first asperity and the second asperity based on the sensor signal generated at the third bias setting;

saving a location on the disk for the first asperity and the second asperity in an asperity log; and second scanning the disk at the locations saved in the asperity log when detecting the first asperity based on the sensor signal generated at the first bias setting and when detecting the second asperity based on the sensor signal generated at the second bias setting.

* * * * *